J. L. SATER.
Corn Planter.
No. 35,546.
Patented June 10, 1862.
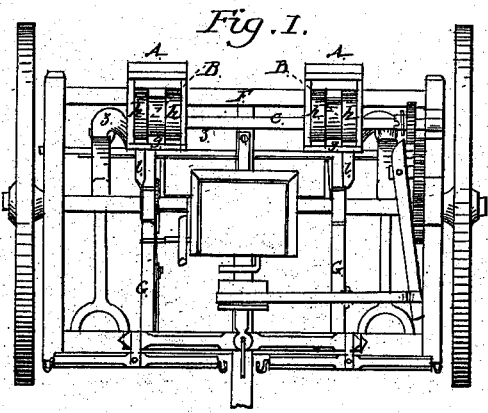
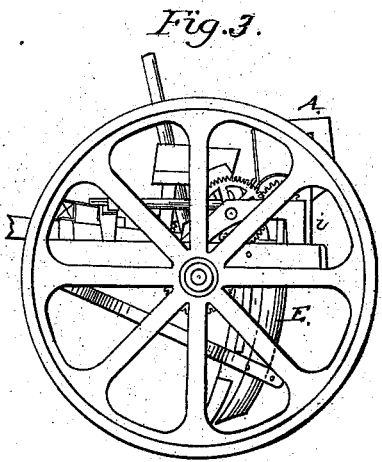
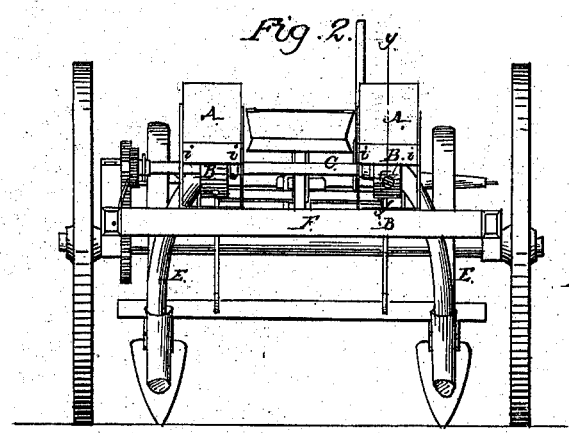
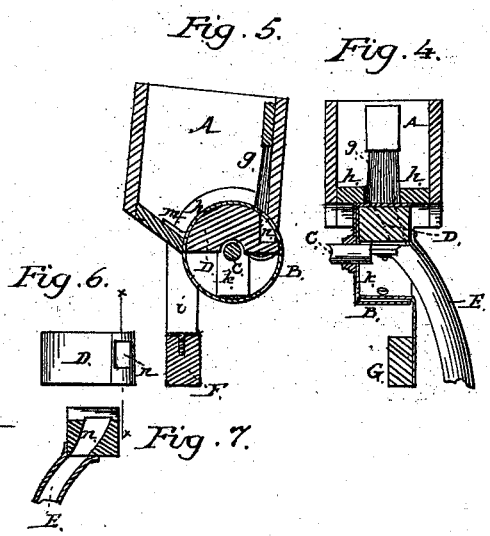
Witnesses:
Inventor:

UNITED STATES PATENT OFFICE.

JONATHAN L. SATER, OF CINCINNATI, OHIO.

IMPROVEMENT IN PLANTING-MACHINES.

Specification forming part of Letters Patent No. 35,546, dated June 10, 1862.

*To all whom it may concern:*

Be it known that I, JONATHAN L. SATER, of Cincinnati, in the county of Hamilton and State of Ohio, have invented a new and useful Improvement in Planting-Machines; and I do hereby declare that the following is a full and exact description thereof, reference being had to the accompanying drawings, which form a part of this specification.

Figure 1 is a top view of my improved planting-machine; Fig. 2, a rear view of the same; Fig. 3, a side view; Fig. 4, a section in the line $z z$ of Fig. 1; Fig. 5, a section in the line $y y$ of Fig. 2; Fig. 6, a side view of a detached portion of the machine. Fig. 7 is a section in the line $x x$ of Fig. 6.

Similar letters indicate like parts in each of the drawings.

My said improvement in planting-machines consists in a new and improved arrangement of certain novel parts in connection with the grain-receptacles of said machines, the said arrangement being such that by its assistance I am enabled to uniformly and unerringly deposit the requisite number of kernels of grain in the tubes, which conduct the same into the furrows formed by the channeling or plow points of the machine, and the other portions of said machine may be constructed in the manner represented in the accompanying drawings, or any other suitable manner.

The grain-boxes A A of my improved planter—which are elevated a short distance above the frame of the machine—are each supported by means of two standards, $i i$, which rise from the hindmost cross-beam, F, of said frame, while they are additionally supported by the braces $l l$, which descend obliquely from said boxes to the frame-timbers G G. The opening in the bottom of each grain-box A is closed by a portion of the periphery of an outwardly-opening hollow cylinder, B, which is secured to the rotating shaft C. The sides of the said hollow cylinders B B are perforated for the reception of the kernels of grain to be planted, the said cylinder-sides being of sufficient thickness to give the requisite depth to the grain-receptacles formed by said perforations.

A segmental block, D, which fits accurately within the upper half of each hollow cylinder, is supported by the metallic strap $k$, which rises from the frame-timber F, as represented in Fig. 4, which strap $k$ also supplies a bearing for the rotating shaft C. The said block D serves the purpose of a bottom to the perforations in the sides of the hollow open cylinder B, within which it is placed, as, by the rotation of the cylinder, they are made to pass over it, thereby converting the said perforations into the desired planting or distributing receptacles during the passage of the same through the grain-box. Just before each of the said planting-receptacles leaves the grain-box in the revolution of the cylinder it passes beneath the brush $g$, which brushes off all superfluous grain that would otherwise be crushed by passing under the lower inner angle of the front side of the grain-box. Immediately after passing the brush $g$ each perforation in either one of the hollow open cylinders B is brought over the mouth of an oblique perforation in the aforementioned segmental block D, and the kernels of grain, dropping into this oblique perforation, pass through the same into the tube E, attached to the said block D, beneath the oblique perforation therein, and, passing down the said tube E, are thus intermittingly discharged into the channels or furrows immediately behind the plow-points of the planter.

The segmental cleats $h h$, which are fitted to the inner sides of the grain-boxes, are so accurately fitted to the peripheries of the hollow cylinders B B that they prevent the wasting of the finest description of seeds that may be placed therein. A close joint is produced between the inclined after sides of the grain-boxes and the peripheries of the hollow cylinders B B by means of the leather straps $m m$, as shown in Fig. 5. As each hollow cylinder B passes in its revolution entirely away from the segmental block D, the apertures in its circumference, which form the receptacles, are left entirely open and exposed to view, and all possibility of the clogging of grain is avoided and its regular discharge secured.

An arrangement of one or more series of planting-receptacles may be made upon each cylinder, thereby regulating the intervals between the drills and their number; or the number of cylinders may be increased for the same purpose.

Having thus fully described my improve- ment in planting-machines, what I claim therein as new, and desire to secure by Letters Patent, is—

The combination of the hollow perforated open cylinders B B with the grain-boxes A A, when the said hollow cylinders are combined with the obliquely-perforated segmental blocks D D and the conducting-tubes E E, in the manner and for the purpose substantially as herein set forth.

The above specification of my improvement in planting-machines signed by me this 15th day of March, 1862.

JONATHAN L. SATER.

Witnesses:
  Z. C. ROBBINS,
  RANDOLPH COYLE, Jr.